(12) United States Patent
Ashley (10) Patent No.: US 9,384,336 B1
(45) Date of Patent: Jul. 5, 2016

(54) SYSTEMS AND METHODS FOR MODIFYING SECURITY BASED ON REPUTATION INFORMATION

(71) Applicant: Symantec Corporation, Mountain View, CA (US)

(72) Inventor: Peter Ashley, Hopkinton, MA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/646,808

(22) Filed: Oct. 8, 2012

(51) Int. Cl.
*G06F 21/30* (2013.01)
(52) U.S. Cl.
CPC ..................... *G06F 21/30* (2013.01)
(58) Field of Classification Search
CPC ....................................................... G06F 21/30
USPC ................................................ 726/1, 22, 29
See application file for complete search history.

(56) References Cited

U.S. PATENT DOCUMENTS

| | | | | |
|---|---|---|---|---|
| 6,948,066 | B2 * | 9/2005 | Hind et al. | 713/168 |
| 7,437,568 | B2 * | 10/2008 | Das-Purkayastha et al. | 713/187 |
| 8,286,239 | B1 * | 10/2012 | Sutton | 726/22 |
| 8,532,343 | B1 * | 9/2013 | Freedman | 382/115 |
| 8,990,948 | B2 * | 3/2015 | Kumar et al. | 726/25 |
| 2002/0095601 | A1 * | 7/2002 | Hind et al. | 713/201 |
| 2005/0103839 | A1 * | 5/2005 | Hewel | 235/380 |
| 2008/0092235 | A1 * | 4/2008 | Comlekoglu | 726/22 |
| 2010/0005291 | A1 * | 1/2010 | Hulten | G06F 21/56 713/156 |
| 2010/0077470 | A1 * | 3/2010 | Kozat | H04L 63/14 726/11 |

* cited by examiner

*Primary Examiner* — William Powers
(74) *Attorney, Agent, or Firm* — Holland & Hart LLP (57) ABSTRACT

A computer-implemented method to assign a security policy is described. A plurality of components of a device are detected. An individual reputation for each of the plurality of components is determined. An overall reputation is determined based on the individual reputations. A security policy is assigned based at least in part on the overall reputation. In some cases, access to at least one component on the device is restricted according to the security policy.

12 Claims, 11 Drawing Sheets

| Component A 115-a | Individual Reputation Score A 505-a | Weighting Factor A 510-a |
| --- | --- | --- |
| Component B 115-b | Individual Reputation Score B 505-b | Weighting Factor B 510-b |
| Component C 115-c | Individual Reputation Score C 505-c | Weighting Factor C 510-c |
| ... | ... | ... |
| Component N 115-n | Individual Reputation Score N 505-n | Weighting Factor N 510-n |

SYSTEMS AND METHODS FOR MODIFYING SECURITY BASED ON REPUTATION INFORMATION

BACKGROUND

The use of computer devices and computer-related technologies continues to increase at a rapid pace. This increased use of computer devices has influenced the advances made to computer-related technologies. Indeed, computer devices have increasingly become an integral part of the business world and the activities of individual consumers. Computer devices may be used to carry out several business, industry, and academic endeavors. The wide-spread use of these devices has been accelerated by the increased use of communication networks, and computer networks, including the Internet.

Many businesses and individuals use one or more communication and/or computer networks to communicate and share data between the various devices connected to the networks. Often this data includes sensitive information. Protecting this sensitive information is a vital concern. The widespread use of computer devices and increased functionally of computer devices serves to increase the need for better security measures as devices may directly store this sensitive information or may provide access to it.

SUMMARY

According to at least one embodiment, a computer-implemented method to execute anti-theft procedures for a device is described. A plurality of components of a device are detected. An individual reputation for each of the plurality of components is determined. An overall reputation is determined based on the individual reputations. A security policy is assigned based at least in part on the overall reputation.

In one embodiment, the plurality of components include each of the components of the device. In some cases, the individual reputation may be obtained from a cloud based reputation store. In one embodiment, the individual reputation may be a category. In this embodiment, determining an overall reputation may include analyzing a distribution of categories and determining whether the overall reputation satisfies a threshold based on the distribution of categories.

Access to at least one component on the device may be restricted according to the security policy. In some cases, restricting access includes restricting the firewall access or the network access. In some cases, restricting access may also include sending an instruction to restrict access to the at least one component on any device.

In one configuration, a sensitivity value may be detected for each of the plurality of components. In this configuration, the at least one component may be selected based on the sensitivity value of the at least one component.

A device configured to assign a security policy may also be described. The device may include a processor and memory in electronic communication with the processor. The device may further include instructions stored in the memory. The instructions may be executable by the processor to detect a plurality of components of a device, determine an individual reputation for each of the plurality of components, determine an overall reputation based on the individual reputations, and assign a security policy on the overall reputation.

A computer-program product to assign a security policy may also be described. The computer-program product may include a non-transitory computer-readable medium having instructions thereon. The instructions may be executable by a processor to detect a plurality of components of a device, determine an individual reputation for each of the plurality of components, determine an overall reputation based on the individual reputations, and assign a security policy on the overall reputation.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Security products are often used to protect devices from security vulnerabilities. One of the challenges of current security products is that security policies are based on hard evaluations of known aspects of a system. However, these approaches do not take into account unknown aspects of the system which are not available to the original policy creator.

Thus, the resulting security policies tend to be binary in nature, difficult to maintain, and are severe in application (a user may be locked out of the system, for example).

In some configurations, the systems and methods described herein may use reputation scores for executable files and other components to dynamically change the security policy applied to one or more devices. One of the benefits of the systems and methods described herein may be that individual reputation scores from differing elements (e.g., executables, dynamic linked libraries (DLLs), files with embedded content, etc.) may be combined into an overall reputation score. Additionally, the individual reputation scores may be combined using one or more "fuzzy logic" distributions. Another benefit of the systems and methods described herein may be that individual reputation scores may be dynamically updated, thus allowing the overall reputation score and thus the security policy to be dynamically updated.

In some configurations, the systems and methods described herein may dynamically modify the security posture of a device based on reputation information (e.g., reputation score). In some embodiments, the systems and methods described herein may include a cloud based reputation store, a reputation evaluation component, a reputation policy to security posture mapping component, and a security posture implementation component. In some embodiments, the cloud based reputation store may store reputation scores for various components. In some cases, these reputation scores and other component information may be computed in the cloud and made available for evaluation on each device.

In some embodiments, the reputation element evaluation component may monitor conditions and operations on a device. Reputation scores may be computed on the device, or fetched from the remote cloud store, for each supported component. In some cases, typical components include: installed applications, executable files, OS components, drivers, locally trusted certificates, history of remote network connection endpoints (remote IP addresses), etc.

In some embodiments, the reputation policy to security posture mapping component may consume the reputation scores of the individual components, and using policy configuration for the system, compute a security posture policy to implement. In some configurations, this component would apply the most secure security posture that is permitted, as allowed by strength of trust in the reputation scores existing on the device.

In some embodiments, the security posture implementation component may implement the security posture defined by the mapping component. In one example, a typical security posture may be implemented by an antivirus and/or firewall product, by setting the configuration of application and/or firewall settings permitted on the device.

Several examples are provided to aid the understanding of the present systems and methods. In one example, a financial officer at a company may be using a computing device that has been determined to be in a highly trusted state. For example, the computing device may be determined to be in the highly trusted state because each of the components of the computing device may have a very good individual reputation. Under these conditions (e.g., the highly trusted state of the computing device), the posture mapping component may modify the firewall of the device to permit access to the company's highly sensitive financial accounts application. In another example, an employee at a company may be using a device that has been determined to be in an untrusted state. For example, the device may be determined to be in an untrusted state because at least one of the components of the device may have a very poor reputation (because the component is known to be bad, for example). Under these conditions (e.g., the untrusted state of the device), the posture mapping component may modify the device to block access to the internal network by disabling the virtual private network (VPN) network access component and setting the firewall to block access to all internal company subnets. In yet another example, an employee at a company may be using a device that has been determined to be in a semi-untrusted state. For example, the device may be determined to be in the semi-untrusted state because one or more of the components of the device may have good individual reputation while one or more of the components of the device may have an unknown reputation. Under these conditions (e.g., the semi-untrusted state of the device), the mapping component may determine that the security posture of the device must be changed to block access to high sensitivity remote applications, but allow most applications and network destinations within the company to continue to function. Continuing with this example, in some cases, the individual reputation of one or more components may be determined to improve (based on good behavior over time, for example). When each of the components has been determined to have a good reputation, the device may be determined to be in a highly trusted state. Under these conditions (each of the components having a good individual reputation, for example), the security posture of the device may be restored to a highly trusted state.

Figure 1:
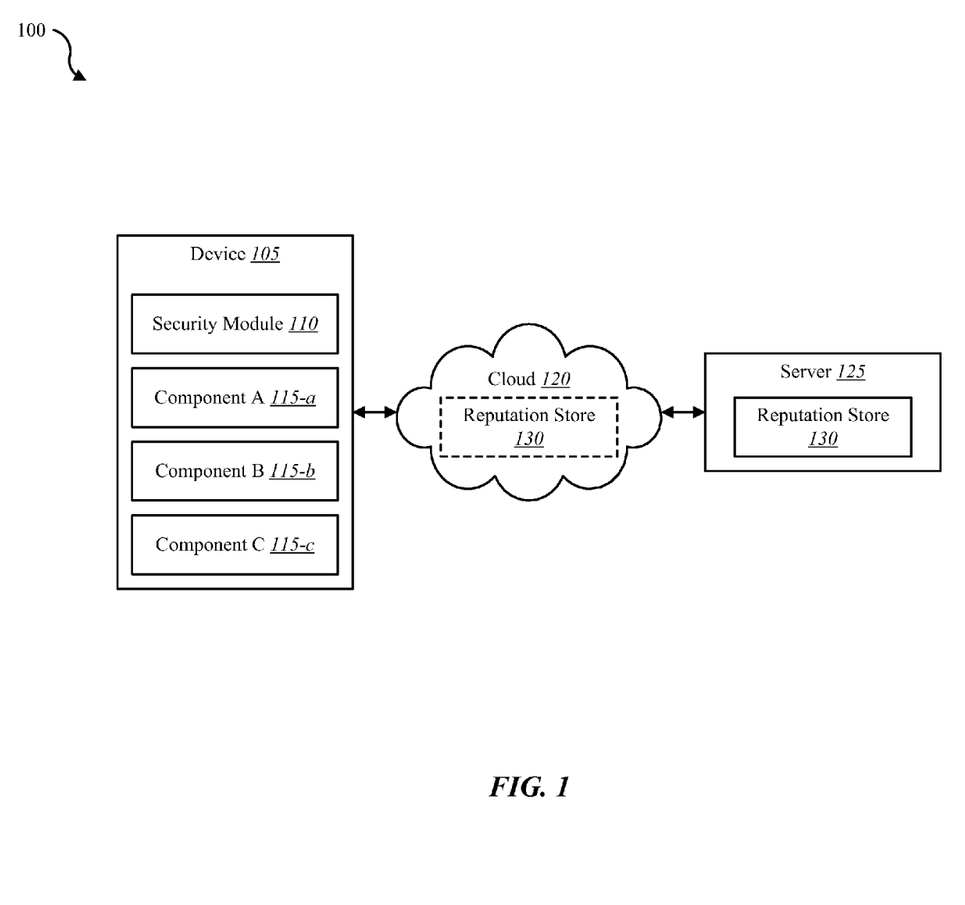
FIG. 1 is a block diagram illustrating one embodiment of an environment in which the present systems and methods may be implemented.

Turning now to the Figures, FIG. 1 is a block diagram 100 illustrating one embodiment of an environment in which the present systems and methods may be implemented. In one embodiment, a device 105 may include various components 115. For example, the device 105 may include component A 115-a, component B 115-b, and component C 115-c. Examples of the device 105 include computers, laptops, tablets, phones, mobile devices, servers, etc.

Components 115 may be hardware components and/or software components. Examples of hardware components include chipsets, expandable cards, Universal Serial Bus (USB) devices, etc. Examples of software components include applications, executables (e.g., .exe, .app), packages (e.g., .zip, .pkg, .dmg), dynamic linked libraries (DLLs), documents (e.g., .doc, .xls), images, videos, music, files containing macros and/or embedded content, etc. In some cases one or more of the components 115 may pose a threat to the device 105 and/or to one or more of the other components 115. In one example, a component 115 may cause one or more vulnerabilities in the system. For example, the component 115 may be malicious (e.g., malware, spyware, etc.) and/or cause the system and/or one or more components 115 to be vulnerable to malicious attacks.

In one embodiment, the device 105 may include a security module 110. In some cases, the security module 110 may detect each of the components 115 (e.g., component A 115-a, component B 115-b, component C 115-c) of the device 105. Upon detection of the components, the security module 110 may determine an individual reputation score for each of the components 115 on the device 105. The security module 110 may determine an overall reputation score based on the individual reputation scores. Upon determining the overall reputation score, the security module 110 may assign and/or modify a security policy (security posture, for example) based on the overall reputation score.

In one example, the security module 110 may determine a reputation score for each component 115 based on a reputation store 130. In one example, the reputation store 130 may be cloud-based (hosted in a cloud 120, for example). In another example, reputation store 130 may be stored on a server 125. The device 105 may communicate with the server 125 to obtain information from the reputation store 130. The cloud 120 may include one or more networks (e.g., IP networks, wireless networks, cellular networks, satellite networks, fiber networks, etc.). Details regarding the security module 110 are described below.

Figure 2:
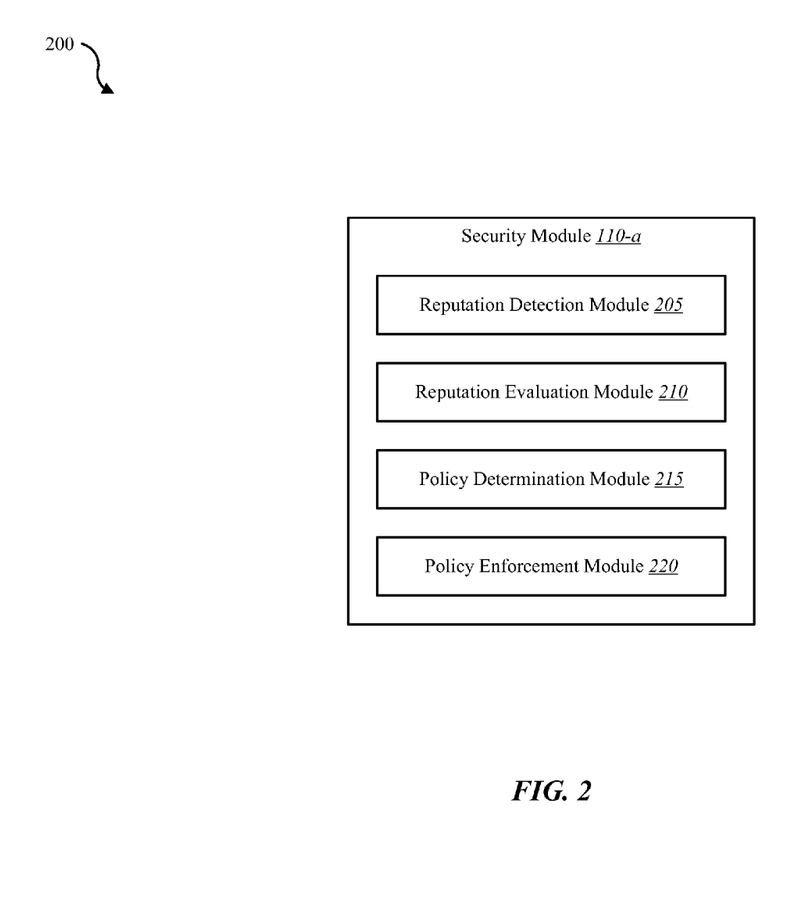
FIG. 2 is a block diagram illustrating one embodiment of a security module.

FIG. 2 is a block diagram 200 illustrating one embodiment of a security module 110-*a*. The security module 110-*a* may be an example of the security module 110 illustrated in FIG. 1. In one embodiment, the security module 110-*a* may include a reputation detection module 205, a reputation evaluation module 210, a policy determination module 215, and a policy enforcement module 220.

The reputation detection module 205 may detect each of the components of a device 105. For example, the detection module 205 may detect that device 105 includes component A 115-*a*, component B 115-*b*, and component C 115-*c*. Upon detecting each of the components 115 of a device 105, the reputation detection module 205 may determine an individual reputation score for each of the detected components 115. Details regarding the reputation detection module 205 are described below.

The reputation evaluation module 210 may collect each of the individual reputation scores determined by the reputation detection module 205 and may generate an overall reputation score based on each of the individual reputation scores. In some configurations, the reputation evaluation module 210 may apply one or more weights to the individual reputation scores to more accurately reflect the impact of various vulnerabilities. In some cases, the overall reputation score may be normalized (e.g., divided based on the number of components used in the calculation) to provide comparable results. Details regarding the reputation evaluation module 210 are described below.

The policy determination module 215 may assign a security policy (e.g., security posture) based on the determined overall reputation score. In one example, the range of possible overall reputation scores may be subdivided into various bands with each band corresponding to a different security policy. For instance, the determination module 215 may assign a first security policy if the overall reputation score is within a first band, assign a second security policy if the overall reputation score is within a second band, and so forth.

The policy enforcement module 220 may enforce the determined security policy. For example, the enforcement module 220 may restrict access based on the selected security policy. Details regarding the policy enforcement module 220 are described below.

Figure 3:
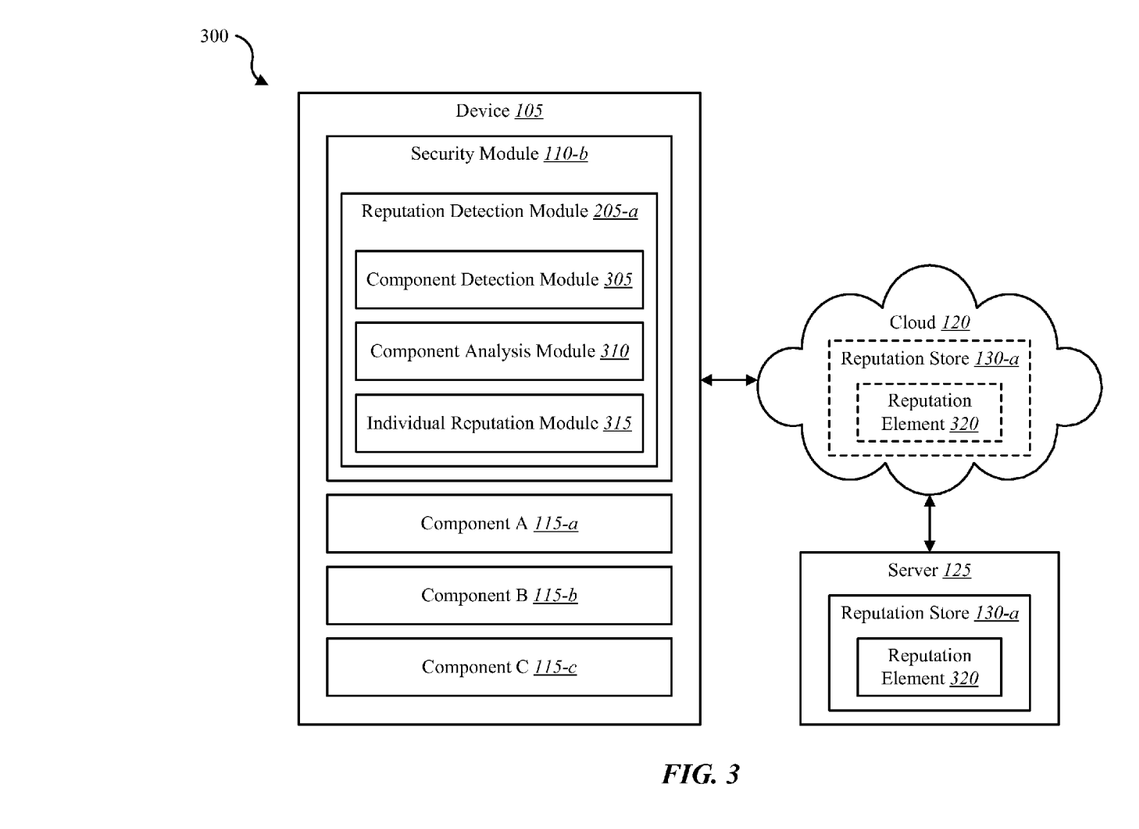
FIG. 3 is a block diagram illustrating one embodiment of a reputation detection module and an environment in which the reputation detection module may be implemented.

FIG. 3 is a block diagram 300 illustrating one embodiment of a reputation detection module 205-*a* and an environment in which the reputation detection module 205-*a* may be implemented. The reputation detection module 205-*a* may be an example of the reputation detection module 205 illustrated in FIG. 2.

The environment 300 may include the device 105, the cloud 120, and the server 125, as described previously. The device 105 may include a security module 110-*b* and various components 115 (e.g., component A 115-*a*, component B 115-*b*, component C 115-*c*). The security module 110-*b* may be an example of the security modules 110 illustrated in FIG. 1 or 2. The reputation detection module 205-*a* may include a component detection module 305, a component analysis module 310, and an individual reputation module 315.

The component detection module 305 may detect each of the components 115 that are attached to and/or installed on the device 105. For example, the component detection module 305 may detect that the device 105 includes component A 115-*a*, component B 115-*b*, and component C 115-*c*.

The component analysis module 310 may analyze each of the detected components 115. For example, the component analysis module 310 may analyze the components 115 to determine one or more characteristics (signature, name, publisher, hash value, data sensitivity, and/or certificate, etc., for example) about the component 115. In some cases, the component analysis module 310 may classify each component 115 based on the analyzed characteristics. For instance, the analysis module 310 may classify a component as a high value component (because it includes sensitive information, for example). In one example, the component analysis module 310 may analyze each of the detected components 115. In one example, the component analysis module 310 may determine that component A 115-*a* is a high value software program, component B 115-*b* is an anti-virus program, and component C 115-*c* is a third-party browser plug-in from an unknown publisher.

The individual reputation module 315 may determine an individual reputation score for each of the components 115. In one example, the individual reputation score for a particular component may be determined by querying a local (e.g., in-house, device specific, etc.) reputation store (reputation store 130-*a*, for example). In one example, the local reputation store may be a custom database of reputation entities (having custom individual reputation scores, for example). If a signature for a reputation element in the local reputation store matches the signature of the component, then the reputation element from the local reputation store may be used (along with the custom individual reputation score, for example). However, if the local reputation store does not include a match for the component or one or more local reputation stores are not being used, then the individual reputation module 315 may query a cloud-based reputation store 130-*a*. In one example, the cloud-based reputation store 130-*a* may include reputation elements 320 with individual reputation scores. In some cases, the reputation store 130-*a* may be externally managed, thus allowing the reputation elements 320 and the individual reputation scores to be constantly and dynamically updated (by various entities, for example). If a signature for a reputation element in the cloud-based reputation store 130-*a* matches the signature of the component, then the reputation element 320 from the reputation store 130-*a* may be used. In some embodiments, the reputation store 130-*a* may be stored on a server 125 and may be hosted to the cloud 120 by the server 125. The reputation store 130-*a* may be an example of the reputation store 130 illustrated in FIG. 1. It may be noted that the augmented approach of a first reputation store (e.g., local reputation store) being augmented with second reputation store (e.g., cloud based, externally managed) may be applied similarly to white-listing and blacklisting approaches. For instance, a first white list may be queried followed by a second white list, and so forth. In some cases, as in the querying of a first reputation store followed by a second reputation store (e.g., cloud based, externally managed), the approach of augmented listing may reduce the time and cost required to maintain local reputation stores and the like.

In one example, each individual reputation score may include a number (e.g., an integer) that represents the level of individual reputation for the component. In another example, each individual reputation score may correspond to a category. For example, the categories may include a first trusted standard (e.g., gold standard), a second trusted standard (e.g., trusted), suspicious, unknown, untrusted, malicious, etc. For instance, continuing with the previous example, the individual reputation score for component A 115-*a* may be gold standard trusted, the individual reputation score for component B 115-*b* may be trusted, and the individual reputation score for component C 115-*c* may be untrusted.

The reputation store (e.g., reputation store 130-*a*) may include a plurality of reputation elements 320. Each reputation element 320 may include information (e.g., signature, name, publisher, hash value, data sensitivity, and/or certificate, etc.) about a component along with an individual reputation score for the component. In some cases, the individual reputation module 315 may match detected component information with one or more of the reputation elements 320 in the reputation store 130-*a*. In one example, the individual reputation module 315 may determine an individual reputation score for a component based on a successful match with a reputation element 320. If the reputation store 130-*a* does not include a reputation element 320 for a particular component, then a reputation element 320 may be created and added to the reputation store 130-*a* based on the information about the detected and analyzed component. It may be noted that the individual reputation score for a particular component may dynamically changed as information about the component is gathered (based on the input of multiple users, for example). In some cases, each of the individual reputation scores in the reputation store 130-*a* may be based on a set of standardized measurements to allow for consistent comparisons between individual reputation scores for different components. In one embodiment, the individual reputation module 315 may determine an individual reputation score for each of the components 115 of the device 105.

Continuing with the previous example, the individual reputation module 315 may access the reputation store 130-*a* to determine an individual reputation score for component A 115-*a* and component B 115-*b* (which may be known to be trusted from trusted publishers) and component C 115-*c* (which may have an unknown publisher). In this example, the individual reputation module 315 may submit information about each of these components 115 to the reputation store 130-*a* and may receive corresponding reputation score for each of the components 115. For instance, the reputations store 130-*a* may indicate that component A 115-*a* and component B 115-*b* may have high (higher valued or higher category, for example) individual reputation scores while component C 115-*c* may have a low (lower valued or lower category, for example) individual reputation score.

Figure 4:
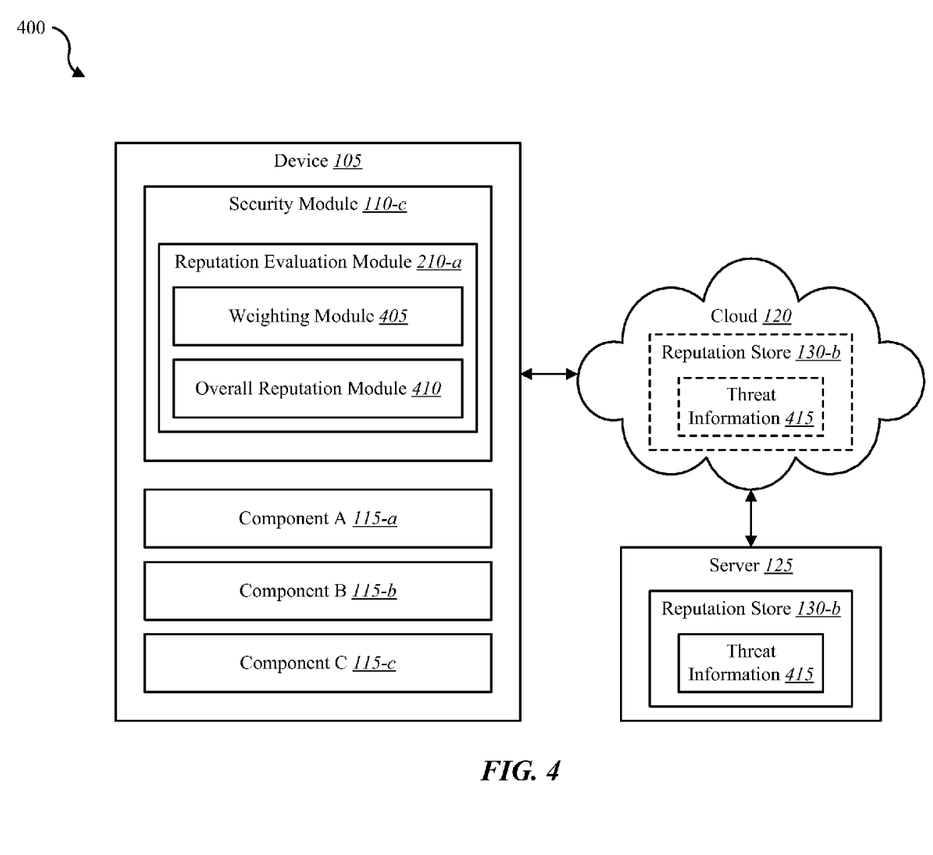
FIG. 4 is a block diagram illustrating one embodiment of a reputation evaluation module and an environment in which the reputation evaluation module may be implemented.

FIG. 4 is a block diagram 400 illustrating one embodiment of a reputation evaluation module 210-*a* and an environment in which the reputation evaluation module 210-*a* may be implemented. The reputation evaluation module 210-*a* may be an example of the reputation evaluation module 210 illustrated in FIG. 2.

The environment 400 may include the device 105, the cloud 120, and the server 125, as described previously. The device 105 may include a security module 110-*c* and various components 115 (e.g., component A 115-*a*, component B 115-*b*, component C 115-*c*). The security module 110-*c* may be an example of the security modules 110 illustrated in FIG. 1, 2 or 3. The reputation evaluation module 210-*a* may include a weighting module 405 and an overall reputation module 410.

In some cases, the weighting module 405 may determine and apply appropriate weightings to each individual reputation score. For example, the weighting module 405 may apply weights to account for the overall security threat associated with each component 115. In one example, the weights may be based on threat information 415 known about each component. In one embodiment, threat information 415 for each component 115 may be included in the reputation store 130-*b* (e.g., cloud based reputation store 130-*b*). In one example, the threat information 415 may indicate a point in a continuum of possible threat values. As described previously, the reputation store 130-*b* may be stored on a server 125 and may be hosted to the cloud 120 by the server 125. The reputation store 130-*b* may be an example of the reputation stores 130 illustrated in FIG. 1 or 3.

In one example, a web browser plug-in from an unknown publisher may be less of a security threat than a DLL from an unknown publisher. In this example, the threat information 415 for the DLL may be higher than the threat information 415 for the web browser plug-in. Thus, the individual reputation score for the DLL may be weighted more heavily than the individual reputation score for the web browser plug-in. Further detail regarding weights is described with respect to FIG. 5.

The overall reputation module 410 may combine the various individual reputation scores (weighted individual reputation scores, for example) to generate an overall reputation score. In one example (in the case of value based reputation, for example), the overall reputation module 410 may average each of the individual reputation values to obtain an overall reputation score. In another example (in the case of category based reputation, for example), the overall reputation module 410 may be statistically determined based on the composition of the category distributions. For instance, three components in the suspicious category may reduce the overall reputation score (e.g., trust level) of the device while only one component in the untrusted category may reduce the overall reputation score of the device. In some embodiments, various rules may be defined based on the distribution of components in various categories. As described previously, the policy determination module 210 may map and/or assign a security policy based on the overall reputation score.

Figure 5:
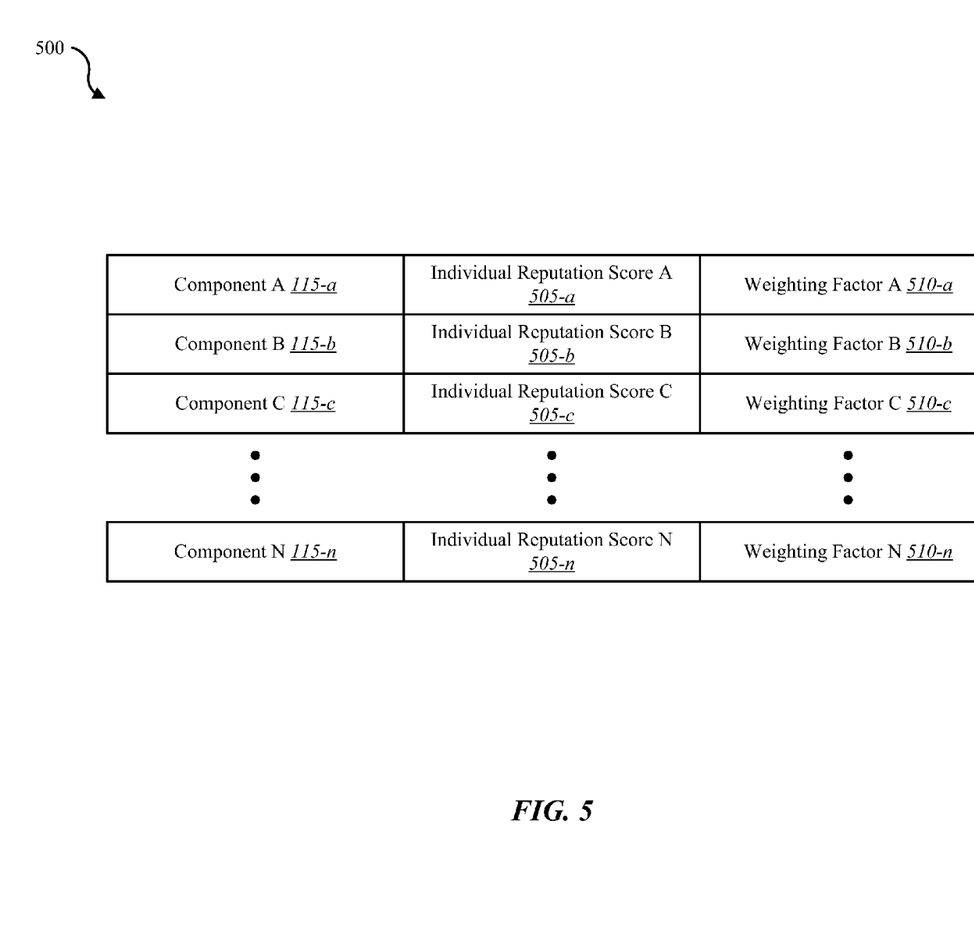
FIG. 5 is a block diagram illustrating an example of a listing of a how the individual reputation score and the weighting factor may be associated with a component.

FIG. 5 is a block diagram 500 illustrating an example of a listing of how the individual reputation score 505 and the weighting factor 510 may be associated with a component 115. In one example, individual reputation score A 505-*a* and weighting factor A 510-*a* may be determined for component A 115-*a*, individual reputation score B 505-*b* and weighting factor B 510-*b* may be determined for component B 115-*b*, individual reputation score C 505-*c* and weighting factor C 510-*c* may be determined for component C 115-*c*, and individual reputation score N 505-*n* and weighting factor N 510-*n* may be determined for component N 115-*n*. In some cases, the individual reputation scores 505 or the individual reputation scores 505 and the weighting factor 510 may be used by the overall reputation module 410 to compute and/or determine an overall reputation score. For instance the overall reputation score may be obtained by averaging the each of the individual reputation scores 505, by averaging each of the products of an individual reputation score 505 and its corresponding weighting factor 510, by analyzing the distribution of components in each category, and/or analyzing a weighted distribution of components in each category.

Figure 6:
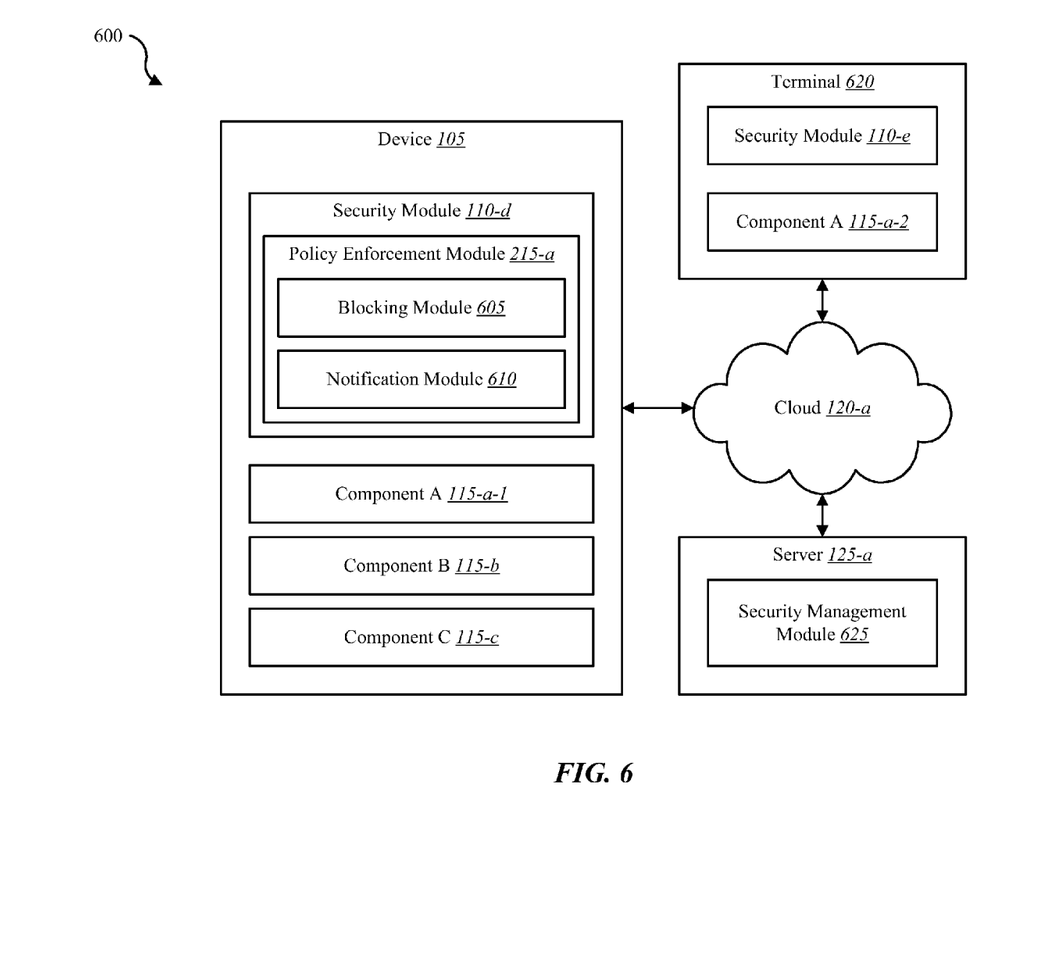
FIG. 6 is a block diagram illustrating one embodiment of a policy enforcement module and an environment in which the policy enforcement module may be implemented.

FIG. 6 is a block diagram 600 illustrating one embodiment of a policy enforcement module 215-*a* and an environment in which the policy enforcement module 215-*a* may be implemented. The policy enforcement module 215-*a* may be an example of the policy enforcement module 215 illustrated in FIG. 2.

The environment 600 may include the device 105 and a terminal 620. In some cases, the device 105 and the terminal 620 may communicate with a server 125-*a* via a cloud 120-*a*. The server 125-*a* may be an example of the server 125 illustrated in FIG. 1, 3, or 4. The cloud 120-*a* may be an example of the cloud 120 illustrated in FIG. 1, 3, or 4.

In one embodiment, the device 105 may include a security module 110-d and various components 115 (e.g., a first component A 115-a-1, component B 115-b, component C 115-c). The security module 110-d may be an example of the security modules 110 illustrated in FIG. 1, 2, 3, or 4.

In one embodiment, the terminal 620 may include a security module 110-e and various components 115 (e.g., a second component A 115-a-2). In some embodiments, the terminal 620 may be a disparate device 105. In some cases, the terminal 620 may represent multiple devices that are disparate from the device 105. In one example, a user may have access to both the device 105 and the terminal 620.

In one embodiment, the server 125-a may include a security management module 625. In some cases, the security management module 625 may enforce one or more security modules across multiple devices (e.g., device 105, terminal 620). For instance, the security management module 625 may enforce access restrictions across multiple devices. In one example, one or more of the security modules 110 (e.g., security module 110-d and security module 110-e) may transmit an indication of their current security policy to the security management module 625. The security management module 625 may then transmit relevant security policy information to each of the devices that will be required to enforce additional security policy restrictions based on a security policy (the security policy applied by security module 110-d, for example).

The policy enforcement module 215-a may include a blocking module 605, and a notification module 610. The blocking module 605 may restrict access based on the security policy. In some cases, the blocking module 605 may determine that a request to access a component has been received. Upon determining that a request to access a component has been received, the blocking module 605 may determine whether the requested component may be accessed based on the security policy. In some cases, the blocking module 605 may determine the sensitivity level of the requested component in order to determine whether the requested component may be accessed based on the security policy. For instance, the security policy may restrict access to components with sensitive information (a high value component, component A 115-a, for example) and may not restrict access to components with little or no sensitive information (a lower value component, for example). If the security policy permits the requested access to the component, then the blocking module 605 may allow access to the requested component. If the security policy does not permit the requested access to the component, then the blocking module 605 may block access to the component. Details regarding the blocking module 605 are described below.

The notification module 610 may provide notifications to a user regarding the application of the security policy and/or enforcement action taken by the policy enforcement module 215-a. For example, the notification module 610 may indicate that one or more components are impacting the security of the device 105 and/or the restrictions that are being enforced by the security policy.

Figure 7:
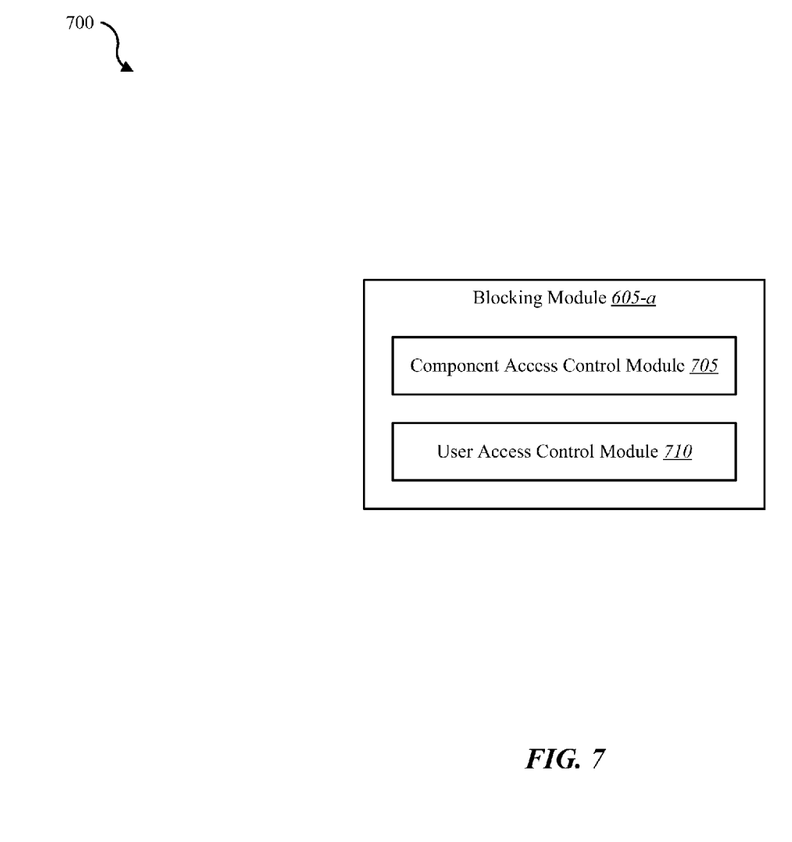
FIG. 7 is a block diagram illustrating an embodiment of a blocking module.

FIG. 7 is a block diagram 700 illustrating an embodiment of a blocking module 605-a. The blocking module 605-a may be an example of the blocking module 605 illustrated in FIG. 6. In one embodiment, the blocking module 605-a may include a component access control module 705 and a user access control module 710. The application of one or more of these access controls may be based on the determined security policy.

The component access control module 705 may restrict access to one or more components 115 on a particular device.

In one example, the component access control module may restrict access to high value components if the device is determined to be in an untrusted state. For instance, continuing the example above, the determined security policy may restrict access to high value components 115 (e.g., first component A 115-a-1) because the low reputation of component C 115-c places the overall reputation of the device below a policy defined threshold. In this example, the component access control module 705 may restrict access (any access, user or by component, for example) to the first component A 115-a on device 105. In this example, component B 115-b may not be a high value component. Therefore, the access control module 705 may not restrict access to component B 115-b. In some cases, the component access control module 705 may additionally restrict access to the one or more components that lowered the overall reputation of the device 105. In some embodiments, the component access control module 705 may restrict access to the first component A 115-a-1 on device 105 but may not impact the ability to access the second component A 115-a-2 on the terminal 620. For example, a user may still be able to access the second component A 115-a-2 on terminal 620. In some cases, restricting only the high value components may permit other components (e.g., component B 115-b the anti-virus program) to operate and analyze and/or repair the system. In some cases, the component access control module 705 may restrict access modifying a firewall and/or network traffic parameters (may not permit a VPN connection, for example). In some cases, restricting access comprises adjusting firewall and/or network connectivity parameters.

The user access control module 710 may restrict a user from accessing one or more components 115 on any device. For instance, continuing the example, above, the determined security policy may restrict access to high value components 115 (e.g., component A 115-a) based on the low reputation of component C 115-c. In this example, the user access control module 710 may restrict access of the user to any component A 115-a on any device. For example, the first component A 115-a-1 on device 105 and the second component A 115-a-2 on terminal 620. Thus, the user may be restricted from accessing the high value components (e.g., component A 115-a) on any device. In some cases, the security management module 625 may coordinate the enforcement of a security policy across multiple devices (e.g., device 105 and terminal 620). For instance, the security module 110-d on device 105 may transmit security policy information to the security management module 625. The security module 110-e may receive one or more security policies to apply from the security management module 625 and may enforce, via a policy enforcement module (not shown), the one or more security policies on terminal 620.

Figure 8:
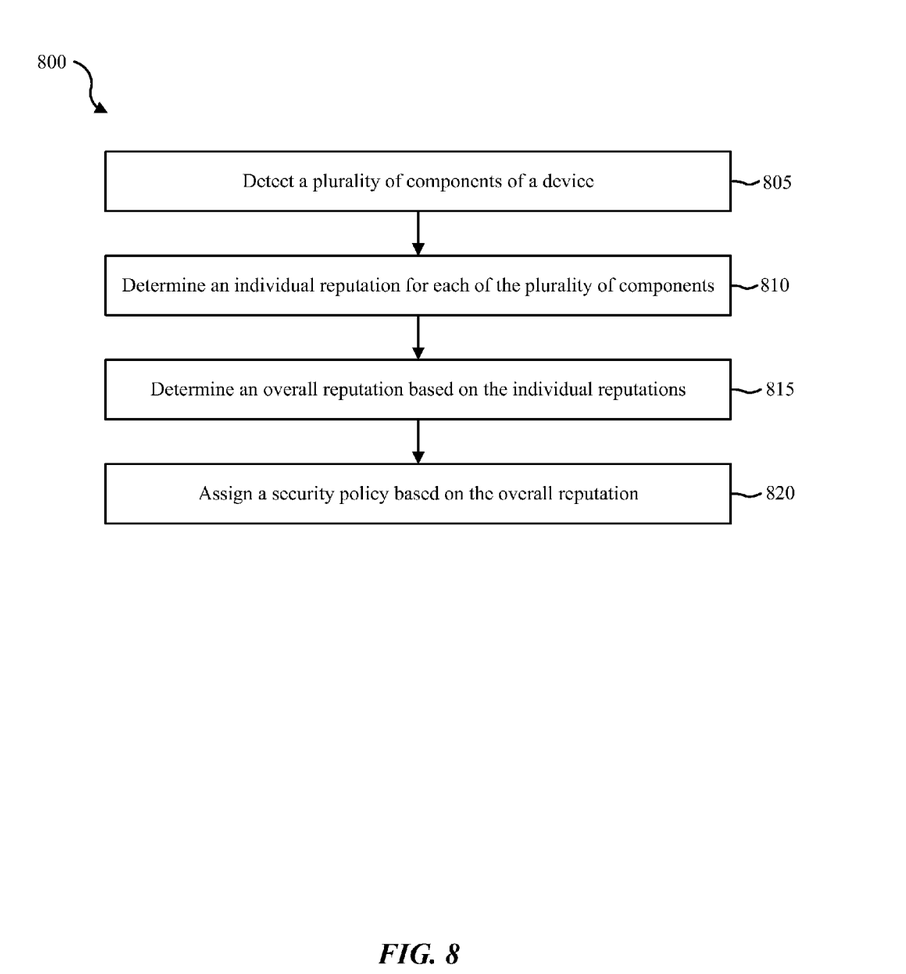
FIG. 8 is a flow diagram illustrating one embodiment of a method to modify security based on reputation information.

FIG. 8 is a flow diagram illustrating one embodiment of a method 800 to modify security based on reputation information. In one configuration, the method 800 may be implemented by a device 105 such as device 105 illustrated in FIG. 1, 3, 4, or 6. In particular, the method 800 may be implemented by the security module 110 of FIG. 1, 2, 3, 4, or 6.

At block 805, a plurality of components may be detected. At block 810, an individual reputation may be determined for each of the plurality of components. For example, an individual reputation may be determined for components other than a requested component. At block 815, an overall reputation may be determined based on the individual reputations. At block 820, a security policy may be assigned based on the overall reputation.

Thus, the method 800 may provide an improved procedure for dynamically updating a security policy and for taking into consideration unknown factors. It should be noted that the method 800 is just one implementation and that the operations of the method 800 may be rearranged or otherwise modified such that other implementations are possible.

Figure 9:
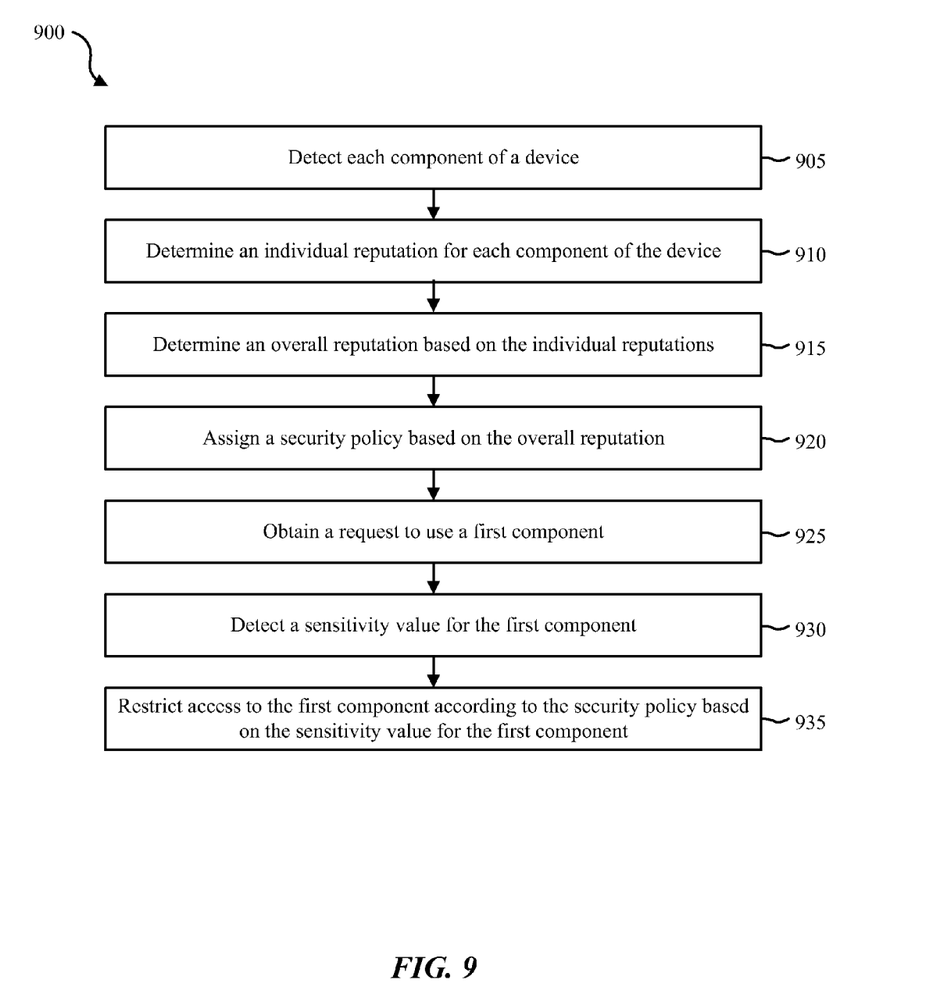
FIG. 9 is a flow diagram illustrating one embodiment of a method to restrict access based on reputation information.

FIG. 9 is a flow diagram illustrating one embodiment of a method 900 to restrict access based on reputation information. In one configuration, the method 900 may be implemented by a device 105 such as device 105 illustrated in FIG. 1, 3, 4, or 6. In particular, the method 900 may be implemented by the security module 110 of FIG. 1, 2, 3, 4, or 6.

At block 905, each component of a device may be detected. At block 910, an individual reputation may be determined for each component of the device. For example, an individual reputation may be determined for both the requested component and each of the other components on the device. At block 915, an overall reputation may be determined based on the individual reputations. At block 920, a security policy may be assigned based on the overall reputation. At block 925, a request to use the first component may be obtained. At block 930, a sensitivity value may be detected for the first component. For example, a determination may be made as to whether the first component is a high value component based on the security policy. At block 935, access to the first component may be restricted according to the security policy based on the sensitivity value for the first component.

Figure 10:
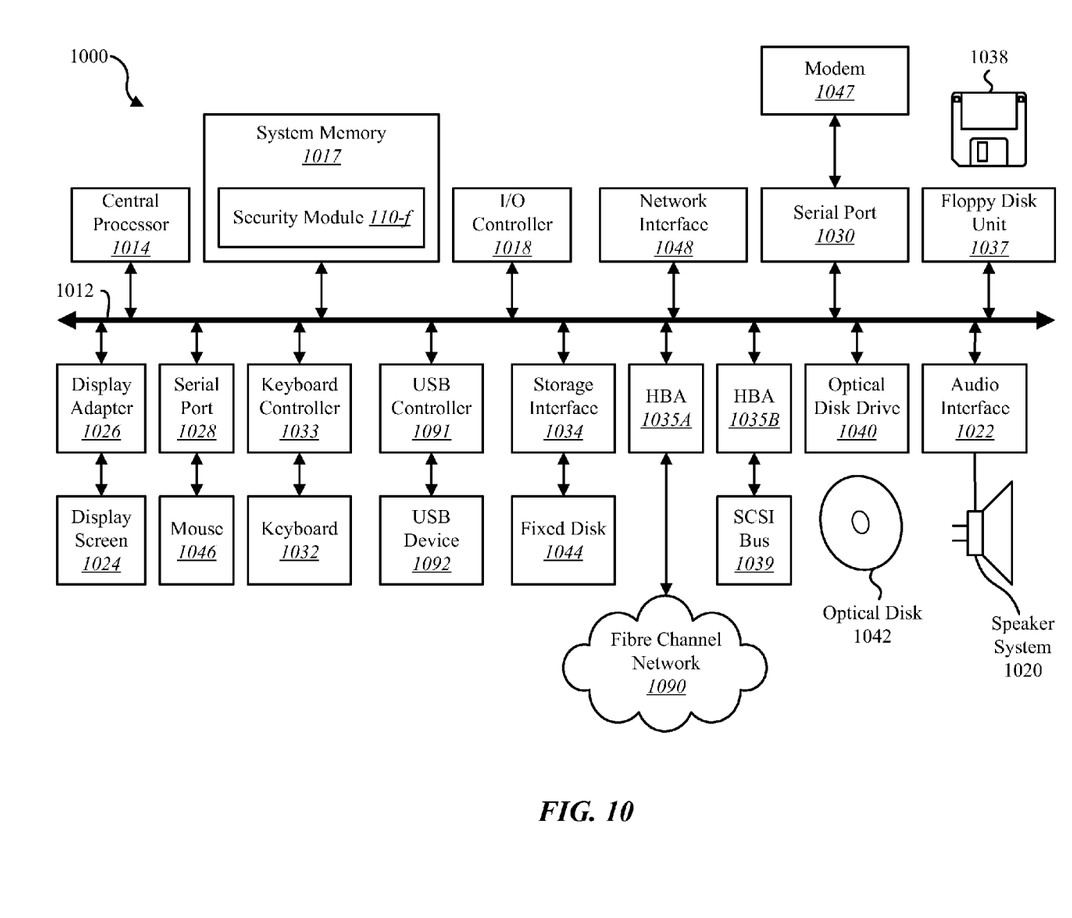
FIG. 10 depicts a block diagram of a computer system suitable for implementing the present systems and methods.

FIG. 10 depicts a block diagram of a computer system 1000 suitable for implementing the present systems and methods. Computer system 1000 includes a bus 1012 which interconnects major subsystems of computer system 1010, such as a central processor 1014, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), multiple USB devices 1092 (interfaced with a USB controller 1091), a storage interface 1034, a floppy disk unit 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1014 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a security module 110-$f$ to implement the present systems and methods may be stored within the system memory 1017. The security module 110-$f$ may be an example of the security module 110 of FIG. 1, 2, 3, 4, or 6. Applications resident with computer system 1000 are generally stored on and accessed via a non-transitory computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1000, can connect to a standard computer readable medium for storage and/or retrieval of information, such as a fixed disk drive 1044. Fixed disk drive 1044 may be a part of computer system 1000 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras and so on). Conversely, all of the devices shown in FIG. 10 need not be present to practice the present systems and methods. The devices and subsystems can be interconnected in different ways from that shown in FIG. 10. The operation of a computer system such as that shown in FIG. 10 is readily known in the art and is not discussed in detail in this application. Code to implement the present disclosure can be stored in a non-transitory computer-readable medium such as one or more of system memory 1017, fixed disk 1044, optical disk 1042, or floppy disk 1038. The operating system provided on computer system 1000 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 11:
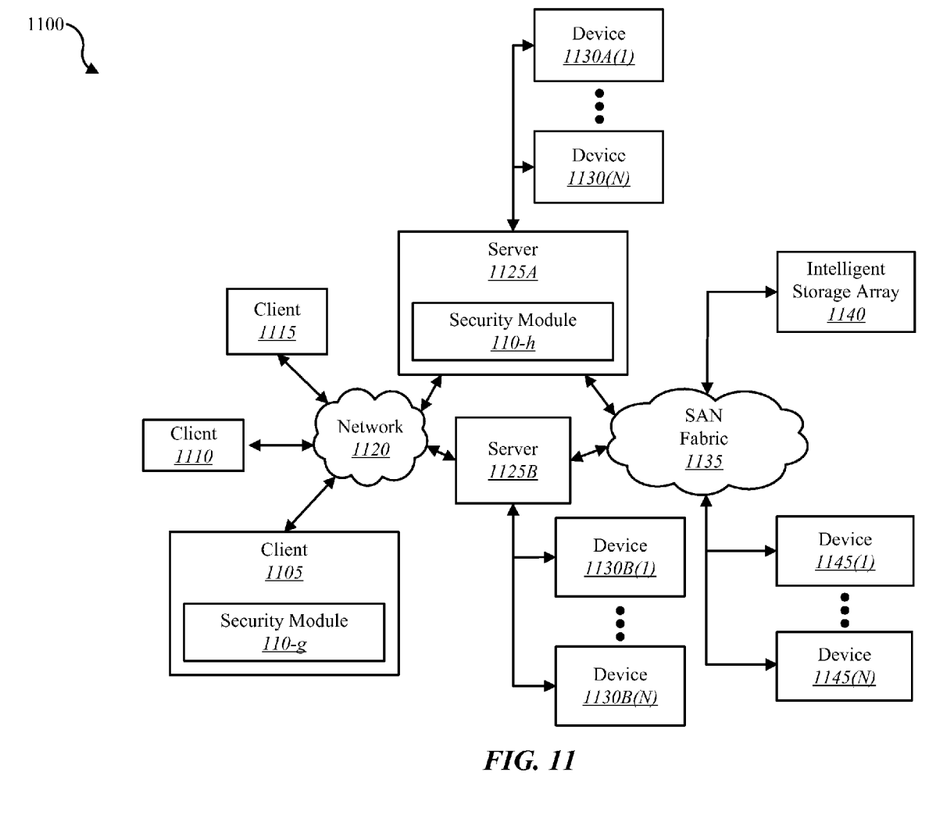
FIG. 11 is a block diagram depicting a network architecture in which client systems, as well as storage servers (any of which can be implemented using computer system), are coupled to a network.

FIG. 11 is a block diagram depicting a network architecture 1100 in which client systems 1105, 1110 and 1115, as well as storage servers 1125A, 1125B (any of which can be implemented using computer system 1000), are coupled to a network 1120. In one embodiment, the security module 110-$g$, 110-$h$ may be located within the storage servers 1125A, 1125B and/or the client systems 1105, 1110, 1115 to implement the present systems and methods. The storage server 1125A is further depicted as having storage devices 1130A(1)-(N) directly attached, and storage server 1125B is depicted with storage devices 1130B(1)-(N) directly attached. SAN fabric 1135 supports access to storage devices 1145(1)-(N) by storage servers 1125A, 1125B, and so by client systems 1105, 1110, 1115 via network 1120. Intelligent storage array 1140 is also shown as an example of a specific storage device accessible via SAN fabric 1135.

With reference to computer system 1000, modem 1047, network interface 1048, or some other method can be used to provide connectivity from each of client computer systems 1105, 1110, and 1115 to network 1120. Client systems 1105, 1110, and 1115 are able to access information on storage server 1125A or 1125B using, for example, a web browser, or other client software (not shown). Such a client allows client systems 1105, 1110, and 1115 to access data hosted by storage server 1125A or 1125B or one of storage devices 1130A(1)-(N), 1130B(1)-(N), 1145(1)-(N) or intelligent storage array 1140. FIG. 11 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to assign a security policy, comprising:
    detecting, by a processor, a plurality of components of a device;
    determining, by the processor, an individual reputation for each of the plurality of components, wherein each individual reputation is categorized based on two or more categories of trust, the two or more categories of trust including at least a suspicious category and an untrusted category;
    determining, by the processor, an overall reputation of the device based on the individual reputations, wherein determining an overall reputation comprises determining whether a tally of components categorized into the untrusted category satisfies a first threshold and determining whether a tally of components categorized into the suspicious category satisfies a second threshold;
    upon satisfying at least one of the first or second threshold, adjusting, by the processor, the overall reputation of the device, wherein the overall reputation is downgraded if the tally of components categorized into the untrusted category includes at least one component, and wherein the overall reputation is downgraded if the tally of components categorized into the suspicious category includes multiple components;
    assigning, by the processor, a security policy based at least in part on the overall reputation of the device, wherein the security policy assigned includes at least one of a restrictive security policy and a non-restrictive security policy, the restrictive security policy restricting access to components associated with sensitive information;
    identifying, by the processor, a first component among the plurality of components having a high sensitivity level based on the first component comprising sensitive information;
    identifying, by the processor, a second component among the plurality of components having a low sensitivity level based on the second component not comprising sensitive information;
    upon determining the restrictive security policy is assigned, restricting, by the processor, access to the first component on the device based on the high sensitivity level of the first component, while allowing access to the second component based on the low sensitivity level of the second component; and
    upon determining the non-restrictive security policy is assigned, allowing, by the processor, access to both the first and second components based on the non-restricted security policy.

2. The method of claim 1, wherein the plurality of components comprise each of the components of the device.

3. The method of claim 1, wherein the individual reputation is obtained from a cloud based reputation store.

4. The method of claim 1, wherein determining an overall reputation comprises:
    analyzing a distribution of categories; and
    determining whether the overall reputation of the device satisfies a threshold based on the distribution of categories.

5. The method of claim 1, wherein restricting access comprises:
    restricting at least one of firewall access and networking access.

6. A device configured to assign a security policy, comprising:
   a processor; and
   memory in electronic communication with the processor; and
   instructions stored in the memory, the instructions being executable by the processor to:
      detect a plurality of components of a device;
      determine an individual reputation for each of the plurality of components, wherein each individual reputation is categorized based on two or more categories of trust, the two or more categories of trust including at least a suspicious category and an untrusted category;
      determine an overall reputation of the device the individual reputations, wherein determining an overall reputation comprises instructions executable by the processor to determine whether a tally of components categorized into the untrusted category satisfies a first threshold and determining whether a tally of components categorized into the suspicious category satisfies a second threshold;
      upon satisfying at least one of the first or second threshold, adjust the overall reputation of the device, wherein the overall reputation is downgraded if the tally of components categorized into the untrusted category includes at least one component, and wherein the overall reputation is downgraded if the tally of components categorized into the suspicious category includes multiple components;
      assign a security policy based at least in part on the overall reputation of the device, wherein the security policy assigned includes at least one of a restrictive security policy and a non-restrictive security policy, the restrictive security policy restricting access to components associated with sensitive information;
      identify a first component among the plurality of components having a high sensitivity level based on the first component comprising sensitive information;
      identify a second component among the plurality of components having a low sensitivity level based on the second component not comprising sensitive information;
      upon determining the restrictive security policy is assigned, restrict access to the first component on the device based on the high sensitivity level of the first component, while allowing access to the second component based on the low sensitivity level of the second component; and
      upon determining the non-restrictive security policy is assigned, allow access to both the first and second components based on the non-restricted security policy.

7. The device of claim 6, wherein the plurality of components comprise each of the components of the device.

8. The device of claim 6, wherein the individual reputation is obtained from a cloud based reputation store.

9. The device of claim 6, wherein the instructions to determine an overall reputation are further executable by the processor to:
   analyze a distribution of categories; and
   determine whether the overall reputation of the device satisfies a threshold based on the distribution of categories.

10. The device of claim 6, wherein the instructions to restrict access are further executable by the processor to:
    restrict at least one of firewall access and networking access.

11. A computer-program product to assign a security policy, the computer-program product comprising a non-transitory computer-readable medium having instructions thereon, the instructions being executable by a processor to:
    detect a plurality of components of a device;
    determine an individual reputation for each of the plurality of components, wherein each individual reputation is categorized based on two or more categories of trust, the two or more categories of trust including at least a suspicious category and an untrusted category;
    determine an overall reputation of the device the individual reputations, wherein determining an overall reputation comprises instructions executable by the processor to determine whether a tally of components categorized into the untrusted category satisfies a first threshold and determining whether a tally of components categorized into the suspicious category satisfies a second threshold;
    upon satisfying at least one of the first or second threshold, adjust the overall reputation of the device, wherein the overall reputation is downgraded if the tally of components categorized into the untrusted category includes at least one component, and wherein the overall reputation is downgraded if the tally of components categorized into the suspicious category includes multiple components;
    assign a security policy based at least in part on the overall reputation of the device, wherein the security policy assigned includes at least one of a restrictive security policy and a non-restrictive security policy, the restrictive security policy restricting access to components associated with sensitive information;
    identify a first component among the plurality of components having a high sensitivity level based on the first component comprising sensitive information;
    identify a second component among the plurality of components having a low sensitivity level based on the second component not comprising sensitive information;
    upon determining the restrictive security policy is assigned, restrict access to the first component on the device based on the high sensitivity level of the first component, while allowing access to the second component based on the low sensitivity level of the second component; and
    upon determining the non-restrictive security policy is assigned, allow access to both the first and second components based on the non-restricted security policy.

12. The computer-program product of claim 11, wherein the plurality of components comprise each of the components of the device.

* * * * *